(12) United States Patent
Kim et al.

(10) Patent No.: US 9,051,036 B2
(45) Date of Patent: Jun. 9, 2015

(54) UNDERWATER MOVING APPARATUS AND MOVING METHOD THEREOF

(75) Inventors: Jaehoon Kim, Daejeon (KR); Youngjun Park, Daejeon (KR); Jongho Eun, Daejeon (KR); Jongung Choi, Daejeon (KR); Jaeyong Lee, Daejeon (KR); Sungmoon Joo, Seoul (KR); Hieyong Jeong, Daejeon (KR); Donghun Lee, Daejeon (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 11 days.

(21) Appl. No.: 13/997,188

(22) PCT Filed: Dec. 21, 2011

(86) PCT No.: PCT/KR2011/009951
§ 371 (c)(1),
(2), (4) Date: Jun. 21, 2013

(87) PCT Pub. No.: WO2012/087033
PCT Pub. Date: Jun. 28, 2012

(65) Prior Publication Data
US 2013/0269585 A1 Oct. 17, 2013

(30) Foreign Application Priority Data

Dec. 22, 2010 (KR) .................. 10-2010-0132653
Apr. 15, 2011 (KR) .................. 10-2011-0035106
Dec. 19, 2011 (KR) .................. 10-2011-0137454

(51) Int. Cl.
*B63G 8/08* (2006.01)
*B63G 8/00* (2006.01)
(Continued)

(52) U.S. Cl.
CPC ... *B63G 8/08* (2013.01); *B63B 1/04* (2013.01); *B63G 8/001* (2013.01); *B63G 8/14* (2013.01);
(Continued)

(58) Field of Classification Search
CPC ............... B63G 8/08; B63G 8/16; B63G 8/22
USPC ............ 114/331, 330, 337; 440/1, 13, 12.63; 700/245
See application file for complete search history.

(56) References Cited

U.S. PATENT DOCUMENTS 3,550,386 A * 12/1970 Ballinger ...................... 405/191
4,565,487 A * 1/1986 Kroczynski ................... 414/730
(Continued)

FOREIGN PATENT DOCUMENTS

JP 06-099889 A 4/1994
JP 06-335876 A 12/1994
(Continued)

OTHER PUBLICATIONS

Bong-Huan Jun et al., "Development Plan of a New Concept Seabed Robot 'CR200'", Journal of the Korean Society of Ocean Engineers (KSOE) Fall Conference 2010 in 6 pages.
(Continued)

*Primary Examiner* — Lars A Olson
*Assistant Examiner* — Jovon Hayes
(74) *Attorney, Agent, or Firm* — Knobbe Martens Olson & Bear, LLP

(57) ABSTRACT

Disclosed are an underwater moving apparatus and a moving method thereof. The underwater moving apparatus of an exemplary embodiment of the present invention includes a body; a propelling device installed on a rear side of the body; a thruster unit including an up and down directional thruster and a left and right directional thruster installed at the body; and a plurality of leg units positioned at both side portions of the body and including a multi-joint module.

22 Claims, 18 Drawing Sheets

(51) Int. Cl.
  *B63G 8/14* (2006.01)
  *B63G 8/16* (2006.01)
  *B63G 8/22* (2006.01)
  *B62D 57/032* (2006.01)
  *B63B 1/04* (2006.01)
  *B63G 8/26* (2006.01)

(52) U.S. Cl.
  CPC .. *B63G 8/16* (2013.01); *B63G 8/22* (2013.01); *B63G 8/26* (2013.01); *B62D 57/032* (2013.01); *B63G 2008/004* (2013.01); *B63G 2008/007* (2013.01)

(56) References Cited

U.S. PATENT DOCUMENTS

| | | | | |
|---|---|---|---|---|
| 5,857,533 A * | 1/1999 | Clewett | ........................... | 180/8.1 |
| 6,588,701 B2 * | 7/2003 | Yavnai | ........................ | 244/23 A |
| 6,974,356 B2 * | 12/2005 | Hobson et al. | ................... | 440/13 |
| 7,427,220 B2 * | 9/2008 | Dudek et al. | ...................... | 440/1 |
| 8,297,214 B2 * | 10/2012 | Lotz | ............................... | 114/330 |
| 8,317,555 B2 * | 11/2012 | Jacobsen et al. | ............ | 440/12.63 |
| 8,494,676 B2 * | 7/2013 | Ayers et al. | .................... | 700/245 |
| 2003/0208303 A1 * | 11/2003 | Okamoto et al. | ............ | 700/245 |
| 2007/0022935 A1 * | 2/2007 | Griffith et al. | ................ | 114/312 |
| 2008/0300722 A1 * | 12/2008 | Dudek et al. | .................. | 700/258 |
| 2013/0269585 A1 * | 10/2013 | Kim et al. | ..................... | 114/331 |

FOREIGN PATENT DOCUMENTS

| | | |
|---|---|---|
| JP | 07-027786 U | 5/1995 |
| JP | 2576179 Y2 | 4/1998 |
| JP | 2002-196818 A | 7/2002 |
| KR | 10-2004-0069648 A | 8/2004 |
| KR | 10-0518628 B1 | 9/2005 |
| KR | 10-0556285 B1 | 3/2006 |
| KR | 10-2010-0028376 A | 3/2010 |

OTHER PUBLICATIONS

International Search Report dated Apr. 4, 2012 of PCT/KR2011/009951 which is the parent application—4 pages.

* cited by examiner

UNDERWATER MOVING APPARATUS AND MOVING METHOD THEREOF

TECHNICAL FIELD

The present invention relates to an underwater moving apparatus and a moving method thereof.

BACKGROUND ART

In general, an underwater moving apparatus is used for exploration of resources on a sea floor, salvage of sunken vessels, removing of oil, installation of submarine cables, repairing of underwater structure, or the like, and is being developed in various types in accordance with the use and an operational method.

The underwater moving apparatus may be classified, in accordance with a control method, into a remotely-operated vehicle (ROV) in which a cable is connected to the underwater moving apparatus, and an autonomous underwater vehicles (AUV) which is operated by its own power without using a cable, and is equipped with a system which determines a direction and a distance to be investigated in accordance with topography of the sea floor, and transmits the investigated data from the sea floor to a mother ship.

Meanwhile, FIG. 1 is a conceptual view illustrating an underwater moving apparatus of a remotely-operated underwater vehicle type of the related art.

Referring to appended FIG. 1, regarding an underwater moving apparatus which is being developed domestically and overseas presently, there are a mother ship 1 for overall operations, an underwater moving apparatus 2 which performs work while being moved on the sea floor, and a cable 3 which is provided to supply power between the mother ship 1 and the underwater moving apparatus 2, and transmit and receive image information, various types of signals, and control signals that are transmitted from the underwater moving apparatus 2.

However, it is difficult to control a posture and a movement of the underwater moving apparatus 2 of the related art in an area of which a flow velocity is high because of influence by the tide, such as the west coast of Korea, and thereby it is not easy to allow the underwater moving apparatus 2 to approach a desired location. That is, as illustrated in FIG. 1, there is a problem in that the underwater moving apparatus 2 does not make a posture but is carried away due to a high flow velocity, and consumes a large amount of energy because it is difficult to control a posture and a movement.

In addition, the underwater moving apparatus has generally a floater installed on an upper portion thereof, and thrusters are suspended in various directions to control a position, and the underwater moving apparatus is moved depending mainly on the thrusters on the sea floor. Therefore, it is difficult to control a movement and a posture when the velocity of the ocean current is high. In addition, because the underwater moving apparatus is moved only by the thrusters and a propelling device, there is a problem in that it is difficult to move the underwater moving apparatus in a state of being seated on a floor surface of the deep sea floor.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide an underwater moving apparatus and a moving method thereof having advantages of allowing the underwater moving apparatus to easily approach a desired position.

In addition, the present invention has been made in an effort to provide an underwater moving apparatus which easily moves in a state of being seated on a floor surface in the water and a moving method thereof.

In addition, the present invention has been made in an effort to provide an underwater moving apparatus having an advantage of easily controlling a posture in the water and a moving method thereof.

Technical Solution

An exemplary embodiment of the present invention provides an underwater moving apparatus, including: a body; a propelling device installed on a rear side of the body; a thruster unit including an up and down directional thruster and a left and right directional thruster installed at the body; and a plurality of leg units positioned at both side portions of the body and including a multi-joint module.

Here, the body may have a cross section in a forward and rearward direction having a circular or elliptical shape, and the body may have a streamlined shape in which a cross section of a front side of the body is broad, and a cross section of a rear side is narrow.

Here, the underwater moving apparatus may further include at least one arm unit positioned at a front side of the body and including a multi-joint module.

Here, the underwater moving apparatus may further include a tail wing unit positioned at a front side of the propelling device.

Here, the tail wing unit may include a vertical tail wing including vertical stabilizing plates positioned at an upper side portion and a lower side portion of the body, and a horizontal tail wing including horizontal stabilizing plates positioned at both side portions of the body.

Here, the underwater moving apparatus may further include a buoyancy generating unit positioned in the body, in which the buoyancy generating unit may include a fluid storage tank, an extendable pocket member connected to the fluid storage tank, and a pump installed between the fluid storage tank and the pocket member to transfer a fluid stored in the fluid storage tank to the pocket member.

A pair of buoyancy generating units may be formed at a front portion and a rear portion of the body.

Meanwhile, the underwater moving apparatus may further include a gravity center moving unit installed in the body, in which the gravity center moving unit may include a weight body formed to be movable in the body, a ball screw coupled to the weight body in order to move the weight body, a driving motor configured to rotate the ball screw, and a pair of LM guides arranged in parallel with the ball screw so as to guide a movement of the weight body.

Meanwhile, the underwater moving apparatus may further include a sensor unit configured to measure at least one of a water depth, a slope, a posture, a distance from an external object, and an azimuth of the body.

Meanwhile, the underwater moving apparatus may further include a communication unit configured to perform communication with a mother ship that operates the body.

Meanwhile, the underwater moving apparatus may further include a control unit configured to control the body so that a posture of the body is converted into a vertical posture at a water surface where the underwater moving apparatus is put into, to move the body to a predetermined water depth, and the posture of the body is converted into a horizontal posture at the predetermined water depth.

Here, the multi-joint module may include a rotating shaft member coupled to the body to be rotatable about a first rotating axis extended in an outward direction of the body, a joint member coupled to one end portion of the rotating shaft member to be rotatable about a second rotating axis which is vertical to the first rotating axis, a first frame member coupled to one end portion of the joint member to be rotatable about a third rotating axis which is vertical to the first rotating axis and the second rotating axis, and a second frame member coupled to one end portion of the first frame member to be rotatable about a fourth rotating axis which is in parallel to the third rotating axis.

Here, the leg unit may further include a foot member rotatably installed on an end portion of the second frame member.

Here, a fixing protrusion may be formed on one end portion surface of the foot member to be extended from the end portion surface in an outward direction.

Here, openings may be formed in the first frame member and the second frame member in a longitudinal direction.

Here, the underwater moving apparatus may further include a hydraulic cylinder having one end portion installed at one side of the first frame member and the other end portion coupled to one side of the second frame member, to rotate the second frame member with respect to the first frame member.

Here, the second frame member may be arranged to be in parallel to the first frame member by being rotated about the fourth rotating axis.

Here, the leg units may be formed in three pairs, the three pairs of leg units are arranged in parallel from a front side to a rear side.

Here, the underwater moving apparatus may further include a first frame member cover unit configured to enclose the first frame member, and a second frame member cover unit configured to enclose the second frame member.

Here, each of the first frame member cover unit and the second frame member cover unit may include a streamlined cover having an airfoil shaped cross section, a plate shaped cover coupled to a concave surface of the streamlined cover and having a fourth rotating axis hole through which the fourth rotating axis penetrates, and a support formed on any one of the streamlined cover and the plate shaped cover to fix the first frame member or the second frame member to inner sides of the streamlined cover and the plate shaped cover.

Here, a third rotating axis hole where the first frame member is coupled to a joint member and through which the third rotating axis penetrates, and a cylinder guide hole formed so as not to hinder a movement of an end portion of a piston of a hydraulic cylinder of the first frame member, may be formed in the plate shaped cover of the first frame member cover unit, and holes corresponding to the fourth rotating axis hole and cylinder guide hole of the plate shaped cover of the first frame member cover unit may be formed in the plate shaped cover of the second frame member cover unit.

Here, the streamlined cover of the first frame member cover unit and the streamlined cover of the second frame member cover unit may be formed to form an airfoil shape in a state in which the second frame member is rotated about the fourth rotating axis to be in parallel to the first frame member, and the plate shaped cover of the first frame member cover unit and the plate shaped cover of the second frame member cover unit may be formed to be overlapped with each other in a state in which the second frame member is rotated about the fourth rotating axis to be parallel to the first frame member.

Meanwhile, another exemplary embodiment of the present invention provides a moving method of the underwater moving apparatus to a target location on a sea floor while overcoming the tide, the method including: a) converting a posture of the body into a vertical posture oriented toward the target location when the underwater moving apparatus is put into a water surface; b) decreasing a velocity or stopping when the underwater moving apparatus moves down vertically to the target location and reaches a predetermined water depth; c) converting a posture of the body into a horizontal posture; and d) moving the underwater moving apparatus to the target location by using at least one of the propelling device, the thruster unit, and the leg unit.

Here, step a) may include converting a posture into the vertical posture in which the front portion is oriented toward the target location by adjusting buoyancy so that negative buoyancy is generated on the front portion of the body, and positive buoyancy is generated on the rear portion; and generating moment for changing and maintaining the vertical posture by moving a center of gravity to the front portion side.

Meanwhile, the method may further include between step a) and step b), driving the propelling device when it is determined that a slope of the body is vertical within an allowable range.

Meanwhile, step b) may include determining whether the underwater moving apparatus reaches any one of a predetermined target water depth and the target distance from the sea floor; and stopping the underwater moving apparatus by stopping an operation of the propelling device or generating reverse thrust.

Meanwhile, step c) may include generating neutral buoyancy when the horizontal posture is made by adjusting buoyancy so that negative buoyancy is generated on the rear portion of the body, and positive buoyancy is generated on the front portion; and generating moment for changing and maintaining the horizontal posture by moving a center of gravity of the front portion side to a central portion.

Meanwhile, the method may further include before step a), folding the plurality of leg units.

Meanwhile, the method may further include, after step d), converting a posture into the vertical posture in which the front portion is oriented toward the water surface by adjusting buoyancy so that the positive buoyancy is generated on the front portion, and the negative buoyancy is generated on the rear portion, in a case in which the underwater moving apparatus moves up after completing work; and generating moment for changing and maintaining the vertical posture oriented toward the water surface by moving a center of gravity to the rear portion side; and raising the underwater moving apparatus vertically to the water surface by generating thrust of the propelling device.

Advantageous Effects

The underwater moving apparatus according to the exemplary embodiment of the present invention converts a posture into a vertical posture by adjusting buoyancy and moving a center of gravity, and moves down quickly to a desired water depth by generating thrust so as to easily move to the target location. Further, the underwater moving apparatus stops at a predetermined water depth or a predetermined distance from the sea floor, converts a posture into a horizontal posture, and then moves to the target location, and therefore the underwater moving apparatus may be safely operated.

In addition, the underwater moving apparatus has a streamlined body and multi-joint legs, which are folded when the underwater moving apparatus swims, so that resistance of fluid may be reduced, and the underwater moving apparatus may adapt to a high flow velocity, which is generated due to influence by the tide and the ocean current.

MODE FOR INVENTION

Figure 1:
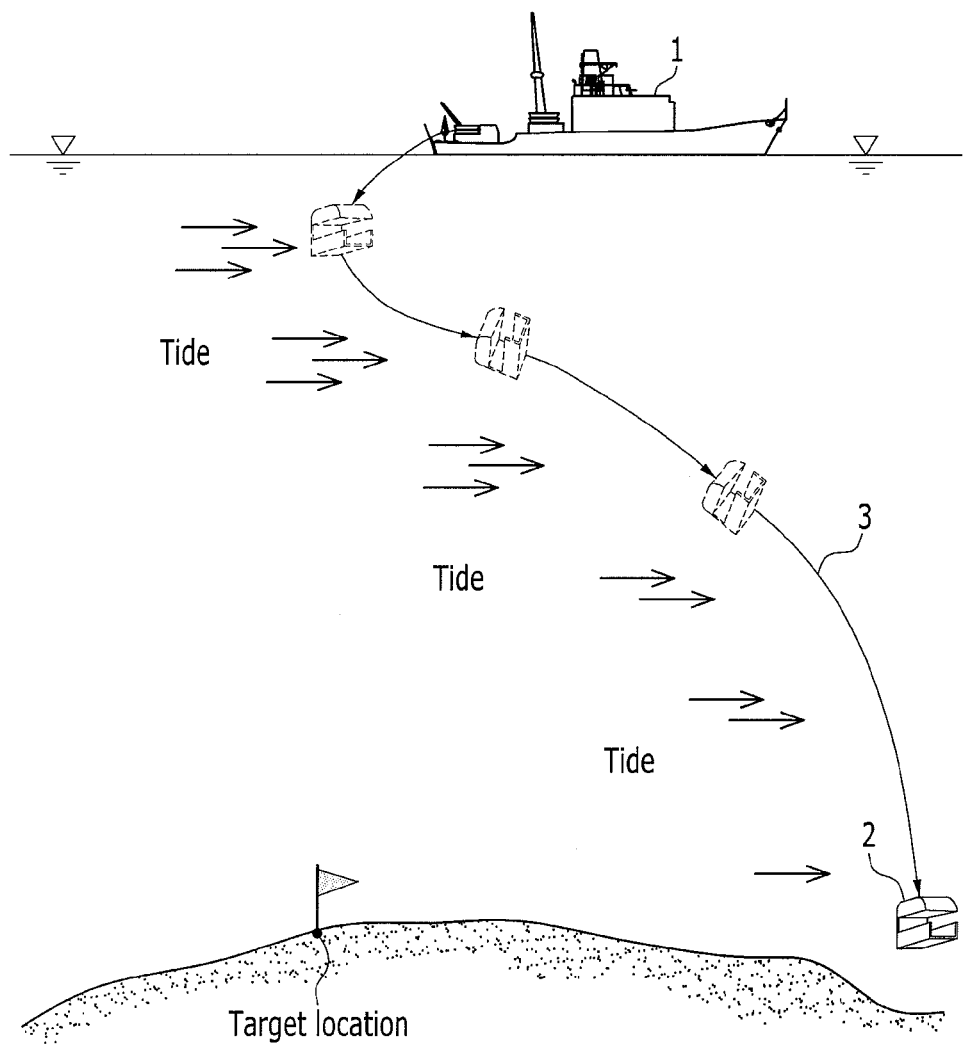
FIG. 1 is a conceptual view illustrating an underwater moving apparatus of the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements. In addition, the terminologies such as " . . . part", " . . . device", " . . . module", or " . . . member", which are disclosed in the specification, refer to a unit of a constituent element which performs at least one of functions or operations.

Before describing the present invention, an underwater moving apparatus according to an exemplary embodiment of the present invention is an underwater moving apparatus that is submerged in the water and used for salvage of sunken vessels, underwater constructions, inspection for underwater structures, exploration of resources, investigation of submarine organism, exploration of underwater topography, and the like, and may be applied to a ROV type or an AUV type, or the like in accordance with a manner of supplying power and performing a control. However, an exemplary embodiment of the present invention will be described on the assumption that the AUV type is used for explanatory convenience, but the present invention is not limited thereto.

In addition, the underwater moving apparatus is described throughout the specification on the assumption that the underwater moving apparatus is operated in the sea, but the present invention is not limited thereto, and the underwater moving apparatus may be applied to the inland waters such as a river or a reservoir.

Figure 2:
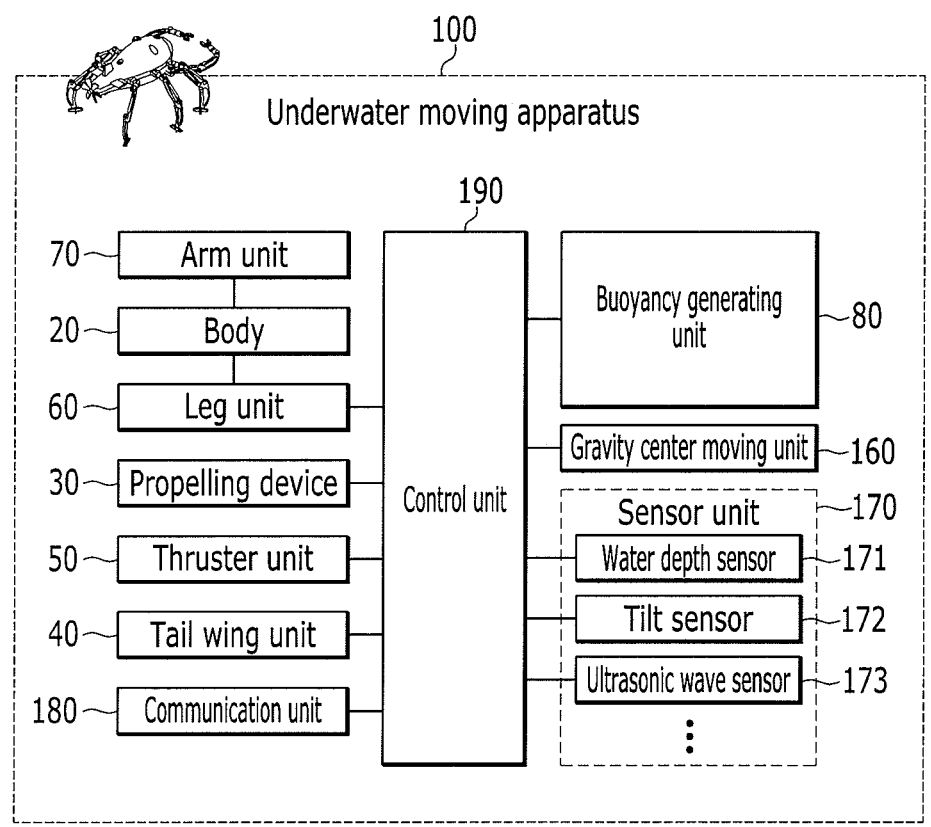
FIG. 2 is a block diagram schematically illustrating a configuration of an underwater moving apparatus for a movement to overcome the tide according to an exemplary embodiment of the present invention.
Figure 3A:
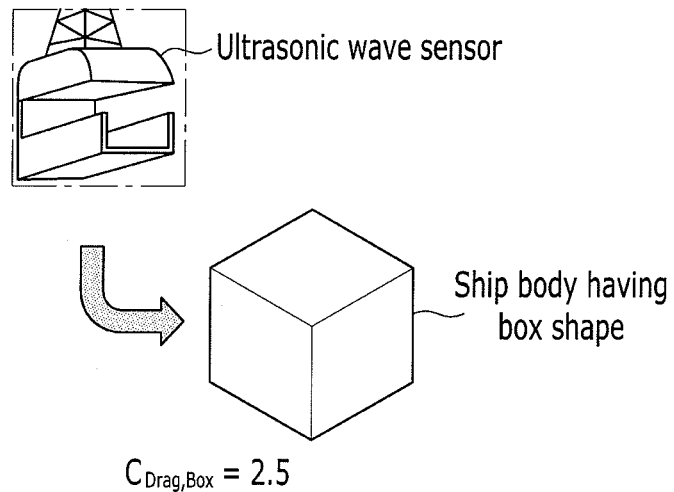
FIGS. 3A and 3B illustrates the underwater moving apparatus according to the exemplary embodiment of the present invention and a shape of a body of the existing underwater vehicle.
Figure 3B:
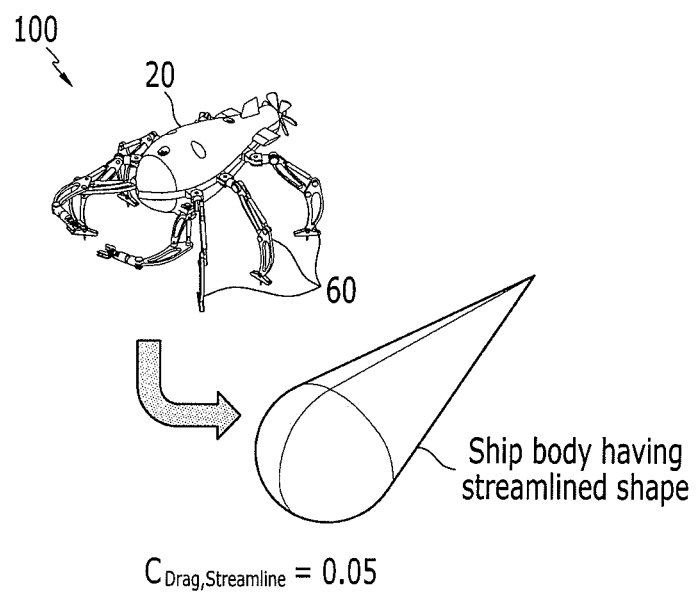
Figure 4:
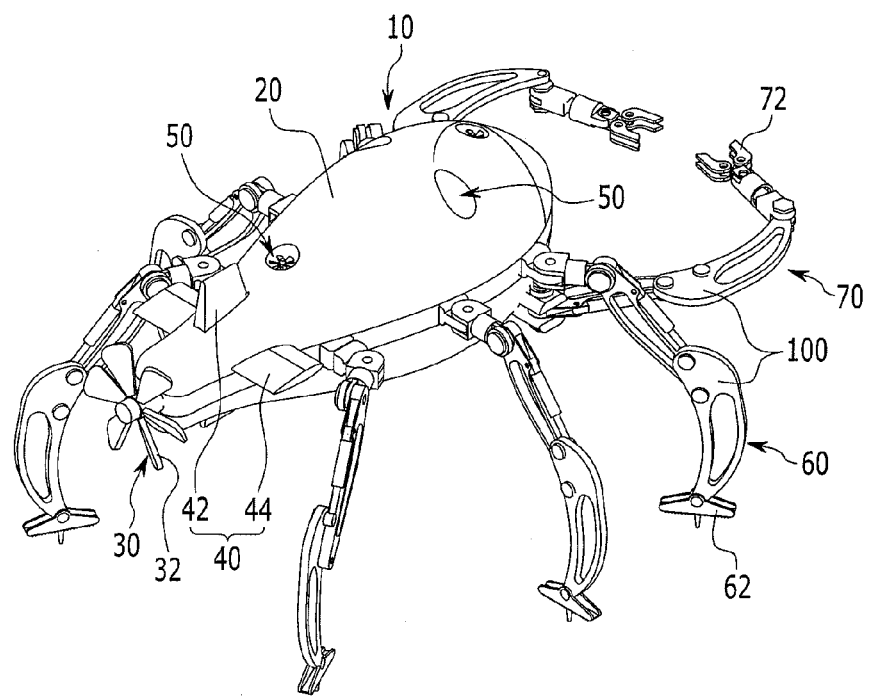
FIG. 4 is a perspective view of the underwater moving apparatus according to the exemplary embodiment of the present invention.
Figure 5:
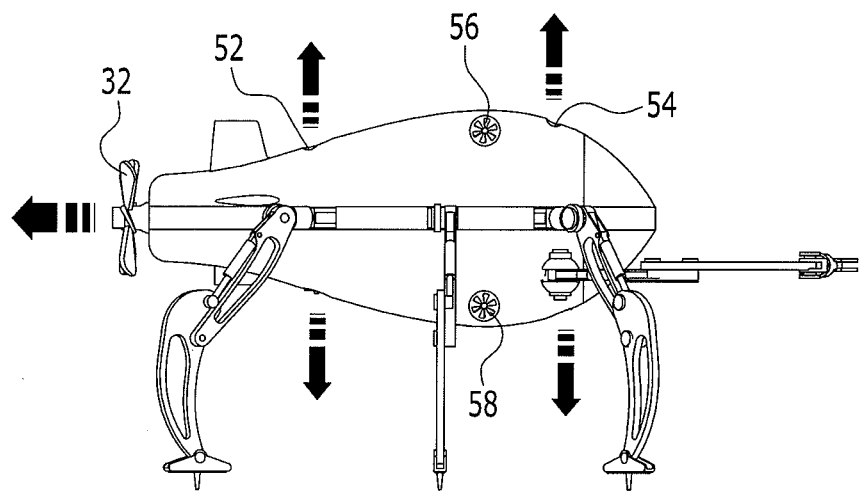
FIG. 5 is a side view of the underwater moving apparatus according to the exemplary embodiment of the present invention.
Figure 6:
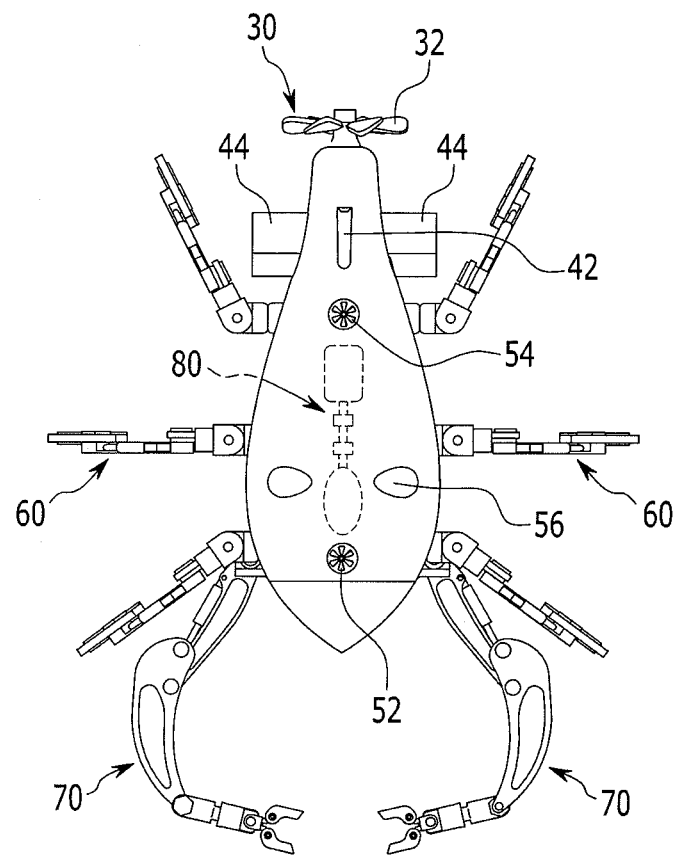
FIG. 6 is a top plan view of the underwater moving apparatus according to the exemplary embodiment of the present invention.
Figure 7:
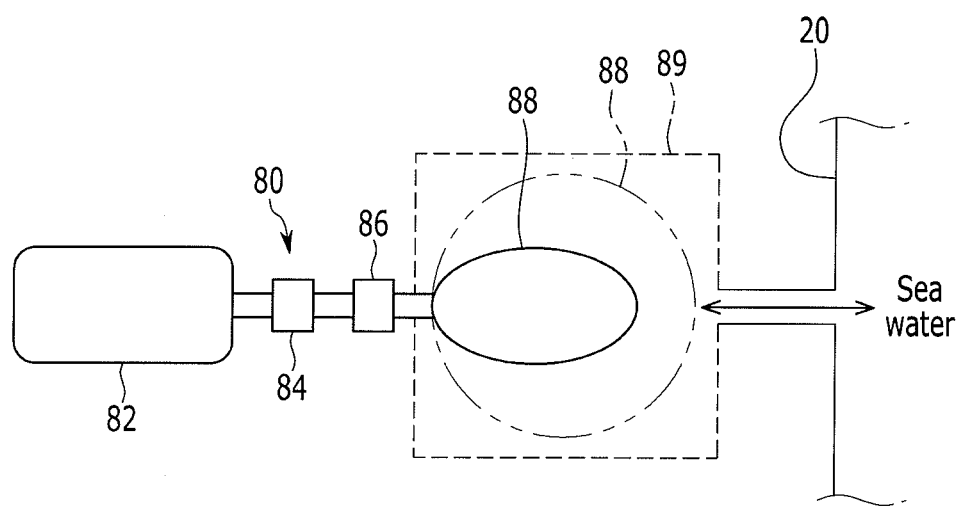
FIG. 7 is a schematic view of a buoyancy generating unit of the underwater moving apparatus according to the exemplary embodiment of the present invention.

Now, an underwater moving apparatus and a moving method thereof according to an exemplary embodiment of the present invention will be described in detail with reference to the drawings. FIG. 2 is a block diagram schematically illustrating a configuration of an underwater moving apparatus according to an exemplary embodiment of the present invention. FIGS. 3A and 3B illustrates the underwater moving apparatus according to the exemplary embodiment of the present invention, and a shape of a body of the existing underwater vehicle. FIG. 4 is a perspective view of the underwater moving apparatus according to the exemplary embodiment of the present invention. FIG. 5 is a side view of the underwater moving apparatus according to the exemplary embodiment of the present invention. FIG. 6 is a top plan view of the underwater moving apparatus according to the exemplary embodiment of the present invention. FIG. 7 is a schematic view of a buoyancy generating unit of the underwater moving apparatus according to the exemplary embodiment of the present invention. Hereinafter, when the underwater moving apparatus is described with reference to the drawings, a direction in which an arm unit 70 of the underwater moving apparatus 10 is positioned is defined as a forward direction of the underwater moving apparatus 10, and a direction in which a propelling device 30 is positioned is defined as a rearward direction of the underwater moving apparatus 10.

Referring to appended FIG. 2, the underwater moving apparatus 10 according to the exemplary embodiment of the present invention includes a body 20, a propelling device 30, a tail wing unit 40, a thruster unit 50, a leg unit 60, a buoyancy generating unit 80, a gravity center moving unit 160, a sensor unit 170, a communication unit 180, and a control unit 190. Further, the underwater moving apparatus 10 according to the exemplary embodiment of the present invention may include the arm unit 70 positioned at a front side of the body 20.

The body 20 has a structure in which a front portion is formed in a streamlined shape in order to minimize a coefficient of drag which is applied to the body 20 under the water, and a rear portion is narrowed from the front portion in a circular cone shape in a longitudinal direction.

More specifically, as may be known from FIGS. 4 to 6, the body 20 has a cross section in a forward and rearward direction having an elliptical or circular streamlined shape. Here, a cross section of a front side of the body 20 is formed as a thick, that is, a broad cross section, and a cross section of a rear side is formed as a thin, that is, a narrow cross section. Further, the body 20 has a streamlined shape from a front end portion to a rear end portion so that resistance of water may be reduced when the body moves in the water.

Referring to appended FIGS. 3A and 3B, a coefficient of drag of the existing underwater vehicle of FIG. 3A, which is formed in a box type without considering a body shape, is 2.5, but in contrast, a coefficient of drag of the streamlined body 20 of FIG. 3B according to the exemplary embodiment of the present invention, is 0.05, thereby minimizing an influence of a fluid.

In addition, the body 20 has a rigid water proof structure so as to protect electronic equipment, which is mounted for driving the underwater moving apparatus, from high hydraulic pressure at a sea floor, and may be subjected to coating so as to reduce a coefficient of drag of a surface.

The buoyancy generating unit 80 configured to move up and down the body in the water, and a driving unit (not illustrated) configured to drive the leg units 60 and the arm unit 70 coupled to the body 20, and the like may be positioned in the body 20.

The propelling device 30 is installed at a rear side of the body 20. The propelling device 30 includes a propeller 32 installed at a rear end portion of the body 20, and a driving motor (not illustrated) positioned in the body so as to rotate the propeller 32.

Accordingly, the underwater moving apparatus according to the exemplary embodiment of the present invention may obtain propulsive force by which the underwater moving apparatus may move forward, by rotating the propeller 32 by driving the driving motor.

The tail wing unit 40 is positioned at a surface of the body, which is positioned at a front side of the propelling device 30. The tail wing unit 40 is a configuration to stably maintain a posture of the body 20.

Referring to FIG. 4, the tail wing unit 40 may include a vertical tail wing 42, and a horizontal tail wing 44.

The vertical tail wing 42 may include vertical stabilizing plates positioned at an upper side portion and a lower side portion of the body 20. Here, a rudder (not illustrated) may be installed on the vertical stabilizing plate so as to be rotatable.

The horizontal tail wing 44 may include horizontal stabilizing plates having a plate shape, which are positioned at a left side portion and a right side portion of the vertical tail wing 42, and horizontally arranged on the body. Here, an elevator (not illustrated) may be installed on the horizontal stabilizing plate to be rotatable.

The thruster unit 50 is installed at the body 20 so as to control a posture of the underwater moving apparatus and assist a movement of the underwater moving apparatus. According to the exemplary embodiment of the present invention, the thruster unit 50 includes up and down directional thrusters 52 and 54, and left and right directional thrusters 56 and 58.

Referring to FIGS. 4 to 6, the up and down directional thrusters 52 and 54 may be two thrusters which are formed to be arranged at the front portion and the rear portion of the body 20 in a vertical direction.

The up and down directional thrusters 52 and 54 are configured to rotate propellers so as to discharge a fluid, for example, sea water, downward, when the body 20 is to be moved upward, or to rotate the propellers so as to discharge sea water in an upper direction, when the body 20 is to be moved in a lower direction.

As may be known from FIGS. 4 to 6, the left and right directional thrusters 56 and 58 may be two thrusters which are formed to be arranged in a horizontal direction at an upper side and a lower side of a central portion in a longitudinal direction of the body 20.

The left and right directional thrusters 56 and 58 are configured to move the body 20 in a left direction or a right direction by rotating propellers so as to discharge a fluid, for example, sea water, in a reverse direction thereof when the body 20 is to be moved in the left direction or the right direction.

Meanwhile, the underwater moving apparatus according to the exemplary embodiment of the present invention may be formed to allow the body to be rotated at a present location when two up and down directional thrusters and two left and right directional thrusters are rotated in different directions, respectively.

In the present exemplary embodiment, the up and down directional thrusters 52 and 54 are provided at the front portion and the rear portion of the body 20, one by one, and the left and right directional thrusters 56 and 58 are provided at the upper side and the lower side of the central portion in a longitudinal direction of the body, one by one. However, the installation positions and the number of up and down directional thrusters and left and right directional thrusters may be variously changed within a range in which a person skilled in the art may readily make an invention in order to control a posture of the body 20 and generate auxiliary thrust.

Meanwhile, according to the exemplary embodiment of the present invention, the buoyancy generating unit 80 is installed in the body 20 so as to move up and down the body 20 in the water.

Referring to FIGS. 6 and 7, the buoyancy generating unit 80 is positioned at the central portion of the body 20, and may include a fluid storage tank 82, a pump 84, a valve 86, and a pocket member 88.

A predetermined fluid is stored in the fluid storage tank 82. Here, the fluid may be gas. The fluid is moved from the fluid storage tank 82 to the pocket member 88 by the pump 84, as necessary, so as to increase a volume of the pocket member 88.

In order to transfer the fluid in the fluid storage tank 82 to the pocket member 88, the pump 84 is positioned between the fluid storage tank 82 and the pocket member 88.

Further, in order to maintain an amount of fluid stored in the pocket member 88 to a predetermined amount, the valve 86 is installed between the pump 84 and the pocket member 88.

The pocket member 88 is made of a flexible material, and formed so that a volume of the pocket member 88 may be adjusted in accordance with an amount of fluid stored in the pocket member 88.

The buoyancy generating unit 80 according to the exemplary embodiment of the present invention is formed to have a structure in which when a volume of the pocket member 88 is increased or decreased in an internal space of the body where the buoyancy generating unit is installed, water having an amount corresponding to the increased or decreased volume, that is, a fluid enclosing the underwater moving apparatus, for example, sea water when the underwater moving apparatus is positioned in the sea, may flow into or out of the body 20, as the volume of the pocket member 88 is increased or decreased.

Accordingly, in the underwater moving apparatus 10 according to the exemplary embodiment of the present invention, the entire density of the body 20 is varied in accordance with an amount of fluid filled in the pocket member 88.

For example, when the fluid increases a volume of the pocket member 88 from a volume illustrated with a solid line of FIG. 7 to a volume illustrated with a two point chain line, the sea water having a corresponding amount is discharged to the outside of the body 20 from the internal space 89 of the body 20 where the buoyancy generating unit 80 is installed, thereby decreasing the entire density of the body 20.

Here, when the entire density of the body 20 is decreased to be lower than the density of sea water enclosing the underwater moving apparatus, positive buoyancy is generated on the body 20 such that the body floats in an upper direction in the sea water.

In contrast, when a volume of the pocket member 88 is decreased, the sea water having an amount corresponding to the decreased volume flows in from the outside of the body 20, thereby increasing the entire density of the body 20.

Here, when the entire density of the body 20 is increased to be higher than the density of the sea water enclosing the underwater moving apparatus 10, negative buoyancy is generated on the body 20 such that the body sinks in a lower direction in the sea water.

By the aforementioned manner, the underwater moving apparatus 10 according to the exemplary embodiment of the present invention may adjust a size of buoyancy of the entire body 20 by adjusting an amount of fluid stored in the pocket member 88.

Meanwhile, according to another exemplary embodiment of the present invention, a pair of buoyancy generating units 80 is installed at the front portion and the rear portion of the body 20.

The pair of buoyancy generating units 80 may adjust buoyancy independently of each other, and the internal spaces of the body where the respective buoyancy generating units are installed may be formed to communicate with each other.

As such, when the pair of buoyancy generating units is formed at the front portion and the rear portion of the body, the buoyancy generating units 80 according to the exemplary embodiment of the present invention may be adjusted to generate positive buoyancy, negative buoyancy, and neutral buoyancy at the front portion and the rear portion of the body 20. Here, the positive buoyancy refers to a state in which buoyancy is greater than gravity so that the body floats, the negative buoyancy refers to a state in which gravity is greater than buoyancy so that the body sinks, and the neutral buoyancy refers to a state in which gravity and buoyancy are identical to each other so that the body does not float or sink.

For example, in a case in which the underwater moving apparatus 80 according to the exemplary embodiment of the present invention is put into a sea area of which a flow velocity is high because of influence by the tide, the buoyancy generating unit 80 adjusts buoyancy so that negative buoyancy is generated on the front portion of the body 20, and positive buoyancy is generated on the rear portion, and allows the underwater moving apparatus to make a vertical (roly poly) posture so that the underwater moving apparatus may move down vertically and quickly toward a target location. Further, when the underwater moving apparatus reaches a predetermined target water depth or a target distance from a sea floor, the neutral buoyancy is generated on the front portion and the rear portion of the body so that the underwater moving apparatus may make a horizontal posture.

Meanwhile, the underwater moving apparatus 10 may include the gravity center moving unit 160 installed in the body 20.

Figure 8:
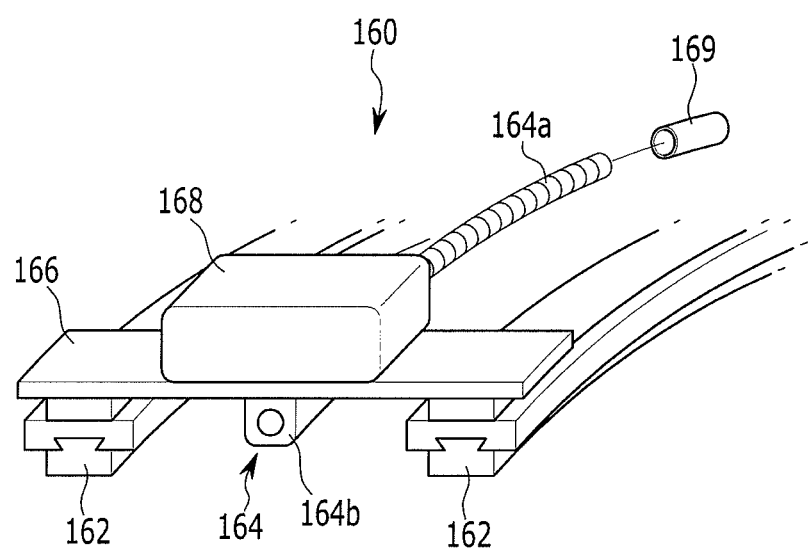
FIG. 8 is a schematic view of a gravity center moving unit of the underwater moving apparatus according to the exemplary embodiment of the present invention.

FIG. 8 is a view schematically illustrating the gravity center moving unit 160.

Referring to FIG. 8, the gravity center moving unit 160 includes a ball screw 164, a movement support 166, a weight body 168, an LM guide 162, and a driving motor 169.

The ball screw 164 is arranged in the body 20 in a forward and rearward direction, and has a shaft 164a which is rotated by the driving motor 169. As the shaft 164a is rotated, a nut 164b coupled to the shaft 164a is moved in the forward and rearward direction.

The movement support 166 is coupled to the nut 164b. The movement support 166 is formed to be movable in accordance with the movement of the nut 164b. The weight body 168 is coupled to the movement support 166, and formed to be moved together with the movement support 166 in accordance with the movement of the movement support 166.

Meanwhile, in order to guide the movement of the movement support 166, a pair of LM guides 162 is installed at both side portions of the ball screw 164.

Here, the ball screw 164 of the gravity center moving unit 160 of the underwater moving apparatus according to the exemplary embodiment of the present invention may be arranged in a left and right direction of the body as well as a forward and rearward direction of the body.

According to the exemplary embodiment of the present invention, the weight body 168 coupled to the movement support 166 is moved forward and rearward in a forward and rearward direction of the body 20 such that a position of a gravity center of the body 20 may be changed, and a posture and a slope of the body 20 may be changed in accordance with a position of the weight body 168.

Meanwhile, referring to FIG. 2, the underwater moving apparatus 10 according to the exemplary embodiment of the present invention includes the sensor unit 170.

The sensor unit 170 may include various sensors which measure the external environment in order to drive the underwater moving apparatus 10, and for example, may include a water depth sensor 171 which checks a water depth at the present position, a tilt sensor 172 which measures a slope and a posture, an ultrasonic wave sensor 173 which is also called a sonar, and measures a distance and an azimuth from objects positioned at a sea floor and a front side, and the like.

Meanwhile, referring to FIG. 2, the underwater moving apparatus 10 according to the exemplary embodiment of the present invention includes the communication unit 180.

The communication unit 180 may include at least one of a wireless communication module which performs communication with a mother ship which manages on the water surface an operation of the underwater moving apparatus 10, a wired communication module which receives power and control signals from the mother ship through a cable, and an ultrasonic wave communication module which performs communication with the mother ship in the water.

Meanwhile, referring to FIG. 2, the underwater moving apparatus 10 according to the exemplary embodiment of the present invention includes the control unit 190.

The control unit 190 controls overall operations of the respective components for operating the underwater moving apparatus 10. Particularly, in a case in which the underwater moving apparatus 10 is put into a sea area of which a flow velocity is high because of influence by the tide, the control unit 190 controls a posture for a movement to overcome the tide, and allows the underwater moving apparatus 10 to be moved to a safe target location.

Meanwhile, according to the exemplary embodiment of the present invention, the leg units 60 are installed at both side portions of the body 20 of the underwater moving apparatus 10. For example, in a case in which the underwater moving apparatus 10 is seated on a floor surface of the sea, the leg units 60 are a configuration to allow the underwater moving apparatus 10 to move in a manner of walking on the floor surface without using the propelling device. According to the exemplary embodiment of the present invention, three pairs of leg units 60 are formed at both side portions of the body 20. Here, the three pairs of leg units 60 may be arranged at both side portions of the body 20 to be parallel to each other from the front side to the rear side.

When more specifically describing the configurations of the leg units 60, the leg unit 60 may include a multi-joint module 100, and a foot member 62 installed on the multi-joint module 100.

Hereinafter, the multi-joint module 100, which configures the leg unit 60 according to the exemplary embodiment of the present invention will be described in more detail with reference to the different drawings.

Figure 9:
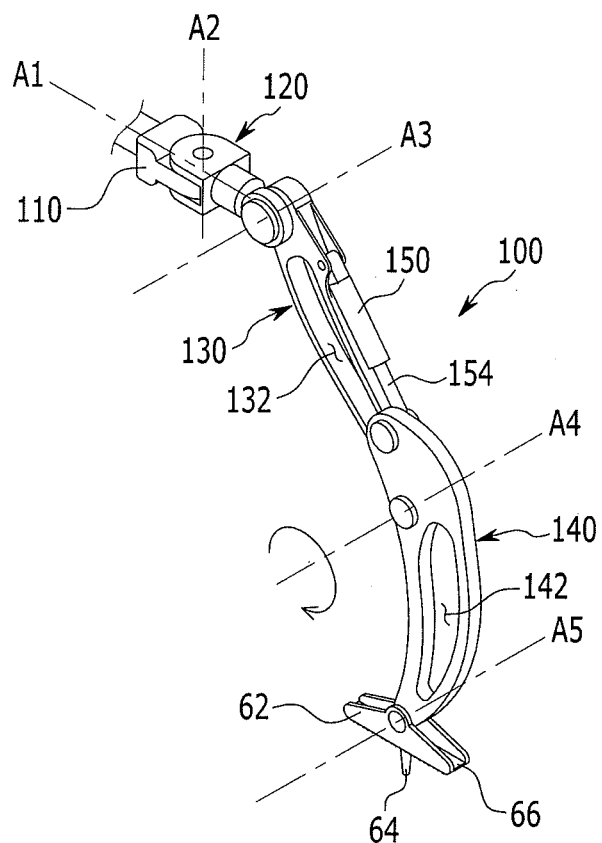
FIG. 9 is a perspective view of an example of a multi-joint module which configures a leg unit of the underwater moving apparatus according to the exemplary embodiment of the present invention.
Figure 10:
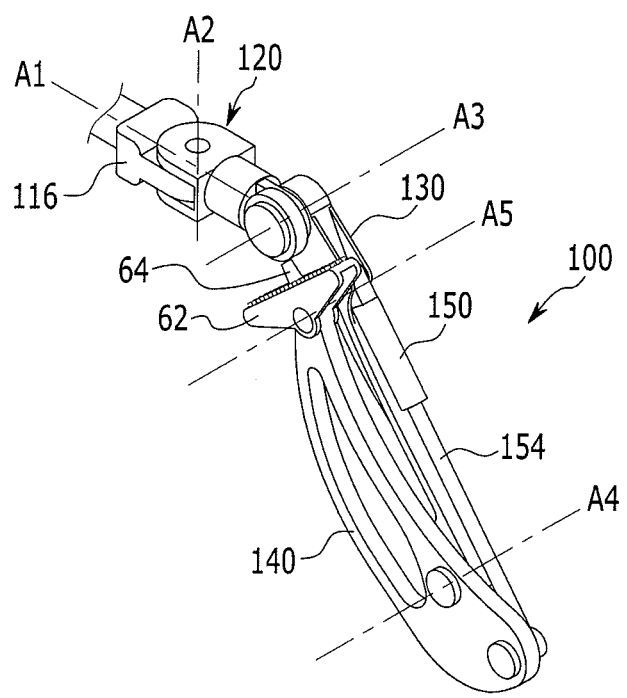
FIG. 10 is a perspective view illustrating a state in which the multi-joint module of FIG. 9 is folded.

FIG. 9 is a perspective view of an example of the multi-joint module 100 which configures the leg unit 60 of the underwater moving apparatus 10 according to the exemplary embodiment of the present invention. FIG. 10 is a perspective view illustrating a state in which the multi-joint module 100 of FIG. 9 is folded.

Referring to FIG. 9, the multi-joint module 100 of the leg unit 60 according to the exemplary embodiment of the present invention includes a rotating shaft member 110, a joint member 120, a first frame member 130, and a second frame member 140.

The rotating shaft member 110 has one end portion coupled to the body 20, and the other end portion formed to be extended in an outward direction of the body 20. Here, the rotating shaft member 110 is formed to be rotatable about a first rotating axis A1 which is arranged in an outward direction of the body 20.

The joint member 120 has one end portion rotatably installed at the other end portion of the rotating shaft member 110. Here, the joint member 120 is formed to be rotatable about a second rotating axis A2 which is vertical to the first rotating axis A1. Here, the rotating shaft member 110 and the joint member 120 are formed to have a structure corresponding to a universal joint.

One end portion of the first frame member 130 is coupled to the other end portion of the joint member 120 to be rotatable about a third rotating axis A3, which is vertical to the first rotating axis A1 and the second rotating axis A2.

The second frame member 140, which is rotatable about a fourth rotating axis A4, is coupled to the other end portion of the first frame member 130.

The first frame member 130 and the second frame member 140, which are coupled to the fourth rotating axis A4, are not arranged on the same plane, but arranged neighboring to each other in a direction in which the fourth rotating axis A4 is extended.

The first frame member 130 and the second frame member 140 are constituent elements which form frames of the leg units 60, which support the body 20 on the floor surface when the underwater moving apparatus 10 is seated on the floor surface in the water.

Here, according to the exemplary embodiment of the present invention, a hydraulic cylinder 150 is installed on one side portion of the first frame member 130 on the same plane as the first frame member 130.

An end portion of a piston 154 of the hydraulic cylinder 150 is coupled to one side of the second frame member 140 to be rotatable. Accordingly, the second frame member 140 may be rotated about the fourth rotating axis A4 by adjusting a length of the piston of the hydraulic cylinder 150.

According to the exemplary embodiment of the present invention, as may be known from FIG. 9, the first frame member 130 and the second frame member 140 are extended in one direction, and may have a flat plate shape having a predetermined thickness in a direction in which the fourth rotating axis A4 extends.

Here, referring to FIG. 9, openings 132 and 142 may be formed in the first frame member 130 and the second frame member 140, respectively, in a longitudinal direction so as to reduce weights of the first frame member 130 and the second frame member 140.

Meanwhile, referring to FIG. 10, when the piston 154 of the hydraulic cylinder 150 is extended, the second frame member 140 is rotated about the fourth rotating axis A4 in a direction of the third rotating axis A3, and the foot member 62 positioned at the other end portion of the second frame member 140 is closely positioned adjacent to the third rotating axis A3 of the first frame member 130.

In the present specification, an operation in which the second frame member 140 is rotated about the fourth rotating axis A4 in a clockwise direction of FIG. 9 to be positioned adjacent to the third rotating axis A3 is expressed as "the second frame member 140 being folded with respect to the first frame member 130".

Here, a state, in which the piston 154 of the hydraulic cylinder 150 is extended to maximally rotate the second frame member 140 about the fourth rotating axis A4 so that the foot member 62 coupled to the second frame member 140 is disposed mostly adjacent to the third rotating axis A3 of the first frame member 130, is a state in which the second frame member 140 is maximally folded with respect to the first frame member 130.

Further, in the present specification, an operation in which the second frame member 140 is rotated about the fourth rotating axis A4 in a counterclockwise direction of FIG. 9 to be positioned to be spaced apart from the third rotating axis A3 is expressed as "the second frame member 140 being spread with respect to the first frame member 130".

Here, a state, in which the piston 154 of the hydraulic cylinder 150 is maximally contracted to rotate the second frame member 140 about the fourth rotating axis A4, so that the foot member 62 of the second frame member A2 is positioned farthest from the third rotating axis A3, is a state in which the second frame member 140 is maximally spread with respect to the first frame member 130.

Therefore, the second frame member 140 is positioned between a state of being maximally folded and a state of being maximally spread with respect to the first frame member 130.

Meanwhile, the underwater moving apparatus 10 according to the exemplary embodiment of the present invention is formed to maintain a state in which the second frame member 140 of the leg unit 60 is maximally folded with respect to the first frame member 130 when the underwater moving apparatus 10 swims in the water.

Further, according to the exemplary embodiment of the present invention, when the underwater moving apparatus 10 swims in the water, the leg unit 60 of the underwater moving apparatus 10 is disposed so that a surface having the smallest area among surfaces that form the leg unit 60 is oriented toward a front side of the body.

To arrange the leg unit 60 as described above, according to the exemplary embodiment of the present invention, the fourth rotating axis A4 of the first frame member 130 is arranged in an up and down direction of the body 20.

When the fourth rotating axis A4 is arranged as described above, while the body 20 moves toward a front side, cross sections in a thickness direction of the first frame member 130 and the second frame member 140 are arranged toward the front side with respect to a progress direction of the body 20, thereby reducing resistance of the leg unit 60 while the underwater moving apparatus swims.

Meanwhile, the foot member 62 is positioned at the other end portion side of the second frame member 140.

The foot member 62 is formed to be rotatable about the fifth rotating axis A5 of the second frame member 140. The foot member 62 is a constituent element for enlarging an area, where the underwater moving apparatus 10 comes into contact with the floor surface, in a state in which the underwater moving apparatus 10 is seated on the floor surface, and to this end, the foot member 62 includes a bottom surface 66 which has a plate shape, and is rotatable about the fifth rotating axis A5.

Further, a protrusion 64 protruding in a lower direction is formed on the bottom surface 66 of the foot member 62. For example, in a case in which the floor surface on which the underwater moving apparatus 10 is seated is a surface made of a material, which is easy to be dented, such as sands, the protrusion 64 is formed so as to be stuck into the floor surface in a state in which the bottom surface of the foot member 62 comes into contact with the floor surface, so that the bottom surface 66 may be more rigidly fixed to the floor surface, thereby allowing the underwater moving apparatus 10 to stably make a stop posture on the floor surface and walk on the floor surface.

Meanwhile, according to the exemplary embodiment of the present invention, the arm unit 70 is positioned on the front side of the body 20.

Referring to FIGS. 4 to 7, one or more, for example, two arm units 70 may be provided on the front side of the body 20. Here, according to the exemplary embodiment of the present invention, the arm unit 70 may include the multi-joint module 100 which forms the leg unit 60.

An operational structure 72, which has a tong structure instead of the foot member of the leg unit 60, is installed on one end portion of the multi-joint module 100 that forms the arm unit 70. Accordingly, the underwater moving apparatus 10 according to the exemplary embodiment of the present invention is formed so that the underwater moving apparatus 10 picks up a predetermined object in the water by using the operational structure 72 having a tong structure of the arm unit 70.

The operational structure 72 having the tong structure, which may be installed on the arm unit 70 of the underwater moving apparatus, for example, may have a finger structure formed on an end portion of a robot arm of a publicly known type, and a detailed description will be omitted.

According to the exemplary embodiment of the present invention, the multi-joint module 100 applied to the leg unit 60 is formed to have the five rotating axes A1, A2, A3, A4 and A5, and therefore the rotating shaft member 110, the joint member 120, the first frame member 130, the second frame member 140, and the foot member 62, which form the multi-joint module 100, may be freely moved. Accordingly, when the multi-joint module 100 is also applied to the arm unit, the tong structure of the arm unit 70 may be freely moved by using the multi-joint module 100, and therefore, various items of work may be easily performed by using the arm unit 70 in the water.

Meanwhile, in the underwater moving apparatus 10 according to the exemplary embodiment of the present invention, the multi-joint module, which configures the leg unit 60, may be formed to be different from the aforementioned exemplary embodiment. Hereinafter, another example of the multi-joint module 100, which configures the leg unit 60 of the present invention will be described with reference to the different drawings.

Figure 11:
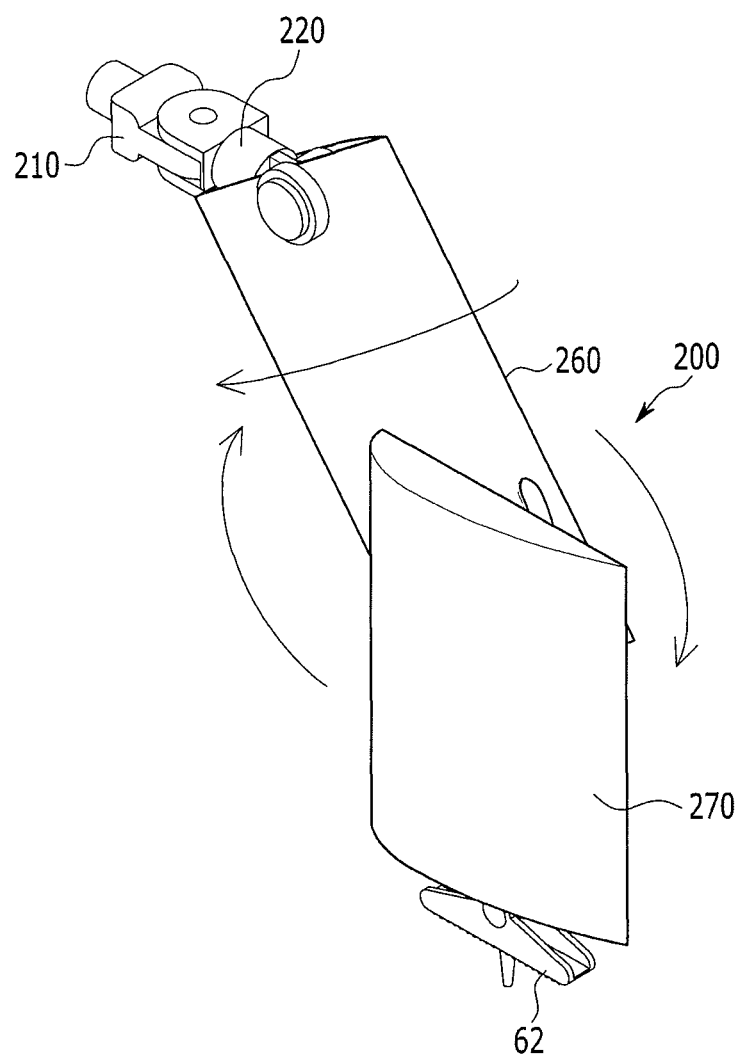
FIG. 11 is a perspective view of another example of a multi-joint module which configures the leg unit of the underwater moving apparatus according to the exemplary embodiment of the present invention.
Figure 12:
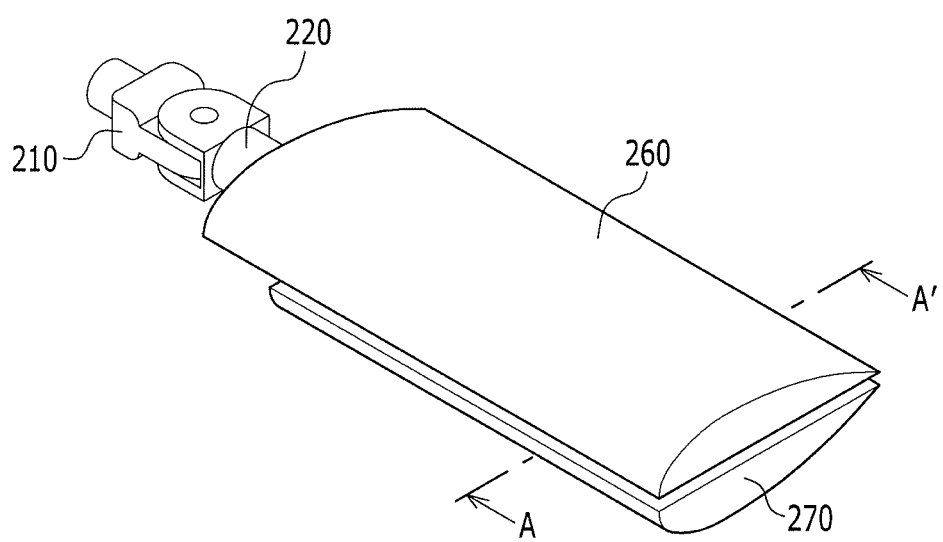
FIG. 12 is a perspective view illustrating a state in which the multi-joint module of FIG. 11 is folded.
Figure 13:
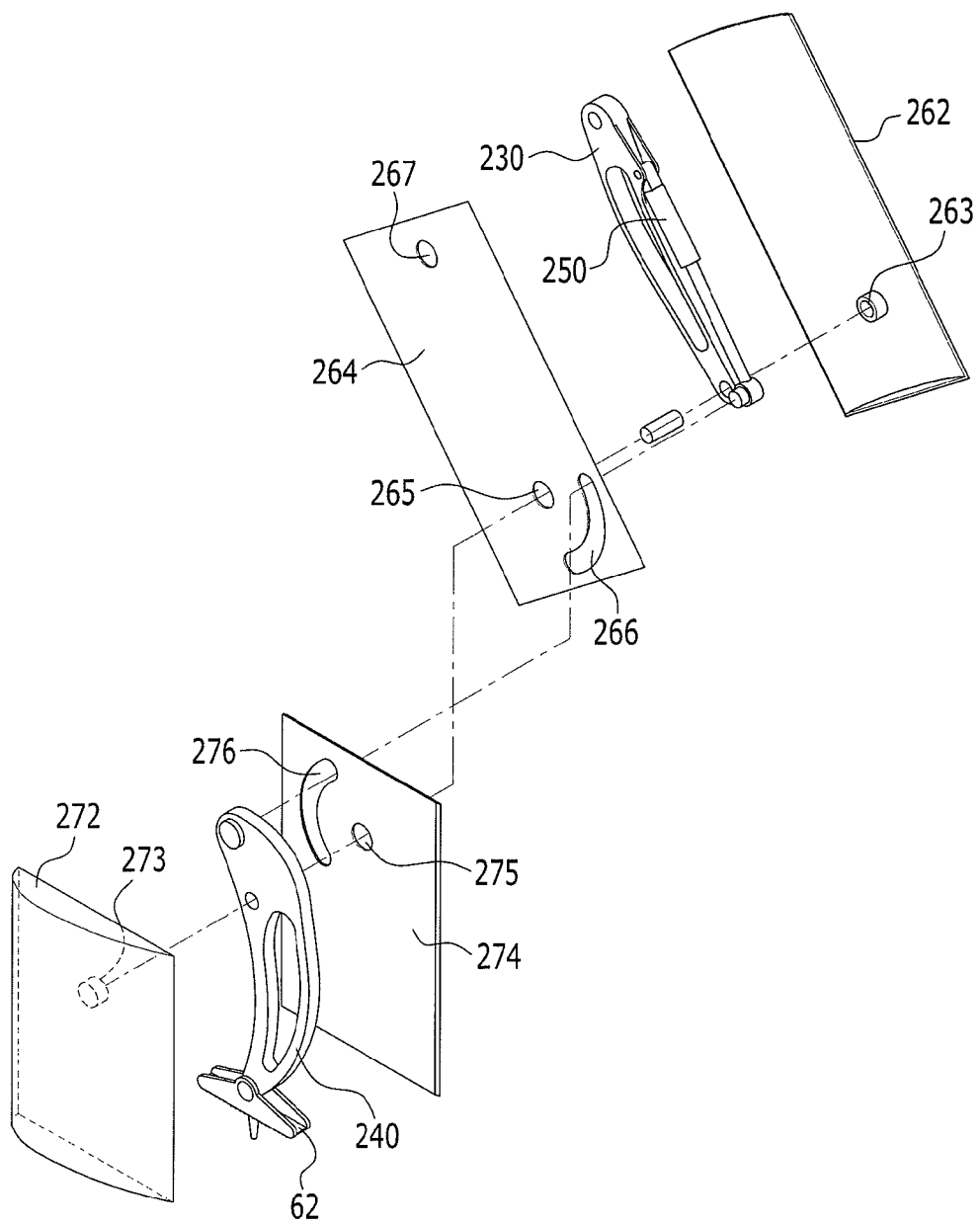
FIG. 13 is an exploded perspective view of the multi-joint module of FIG.
Figure 14:
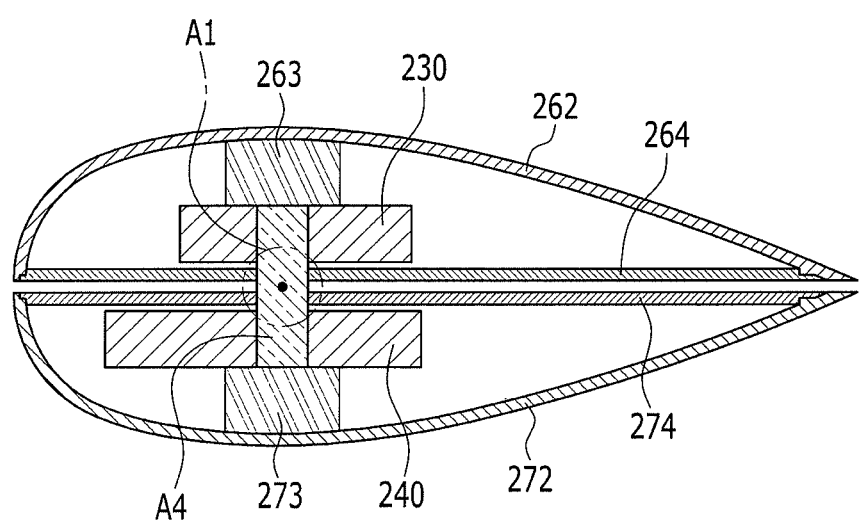
FIG. 14 is a cross-sectional view taken along line A-A' of FIG. 12.
Figure 15:
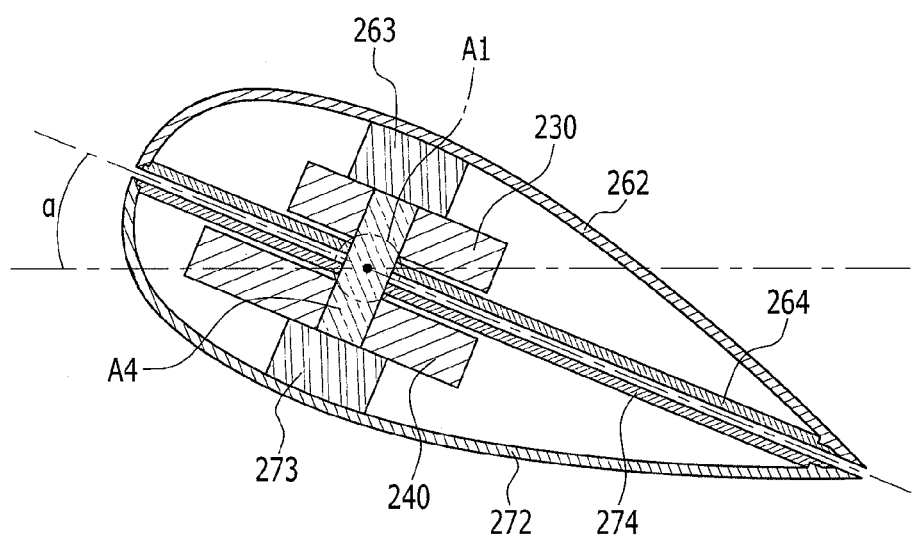
FIG. 15 is a view illustrating a state in which the multi-joint module of FIG. 14 is inclined.

FIG. 11 is a perspective view of another example of the multi-joint module which configures the leg unit 60 of the underwater moving apparatus according to the exemplary embodiment of the present invention. FIG. 12 is a perspective view illustrating a state in which the multi-joint module of FIG. 11 is folded. FIG. 13 is an exploded perspective view of the multi-joint module of FIG. 11. FIG. 14 is a cross-sectional view taken along line A-A' of FIG. 12. FIG. 15 is a view illustrating a state in which the multi-joint module of FIG. 14 is inclined.

Referring to FIG. 11, the multi-joint module 200, which configures the leg unit 60 of the underwater moving apparatus according to the exemplary embodiment of the present invention, further includes a first frame member cover unit 260 and a second frame member cover unit 270 positioned outside the first frame member 130 and the second frame member 140, compared to the aforementioned exemplary embodiment.

The first and the second frame member cover units 260 and 270 have an outer appearance having an airfoil shape, respectively, and formed to enclose a first frame member 230 and a second frame member 240, respectively. Here, in the present specification, the description that the first and second frame member cover units 260 and 270 enclose the first frame member 230 and the second frame member 240 may mean that the first and the second frame member cover units 260 and 270 enclose the first and the second frame members 230 and 240 so as to maintain a watertight state therebetween. However, it should be interpreted that the description that the first and the second frame member cover units 260 and 270 enclose the first frame member 230 and the second frame member 240 also includes a meaning that the first and the second frame member cover units 260 and 270 are positioned in the vicinity of the first and the second frame members 230 and 240 in order to reduce resistance of water due to shapes of the first and the second frame members 230 and 240 when the underwater moving apparatus having the first and the second frame members 230 and 240 moves in the water, while being positioned in the vicinity of the first and the second frame members 230 and 240. In this case, the first and the second frame member cover units 260 and 270 may not enclose the first and the second frame member 230 and 240 in a watertight state. That is, a plurality of openings may be formed in the first and the second frame member cover units 260 and 270 so that interactions of members, which are connected to the first and the second frame members 230 and 240, are not hindered.

Accordingly, when the underwater moving apparatus 10 having the first frame member cover unit 260 and the second frame member cover unit 270 swims in the water, resistance of water, which is produced by the leg unit 60 may be very small.

In more detail, referring to FIGS. 11 to 15, the first frame member cover unit 260 and the second frame member cover unit 270 include a streamlined cover unit 262 and 272, and a plate shaped cover 264 and 274, respectively.

The streamlined cover 262 and 272 has an airfoil shaped cross section, and includes therein a space in which the first frame member 230 or the second frame member 240 is positioned.

The plate shaped covers 264 and 274 are coupled to one end portions of the streamlined covers 262 and 272, thereby allowing the streamlined covers 262 and 272 and the plate shaped covers 264 and 274 to enclose the first frame member 230 or the second frame member 240.

Referring to FIG. 13, a third rotating axis hole 267 where the first frame member 230 is coupled to a joint member 220 and through which the third rotating axis A3 penetrates, a fourth rotating axis hole 265 through which the fourth rotating axis A4, with which the first frame member 230 is coupled to the second frame member 240, penetrates, and a cylinder guide hole 266 formed so as not to hinder a movement of an end portion of a piston 254 when the end portion of the piston 254 of a hydraulic cylinder 250 of the first frame member 230 is rotatably coupled to one side of the second frame member 240, are formed in the plate shaped cover 264 of the first frame member cover unit 260.

In addition, holes 275 and 276 corresponding to the fourth rotating axis hole 265 and cylinder guide hole 266 of the plate shaped cover 264 of the first frame member cover unit 260 are also formed in the plate shaped cover 274 of the second frame member cover unit 270.

Meanwhile, the foot member 62 is positioned at one end portion side of the second frame member cover unit 270 to be rotatable about the fifth rotating axis A5 of the second frame member, and therefore the one end portion side of the second frame member cover unit 270 may be formed in an opened type so as not to hinder a rotation of the foot member.

Accordingly, even though the first frame member cover unit 260 and the second frame member cover unit 270 enclose the first frame member 230 and the second frame member 240, movements of the first frame member 230, the second frame member 240, and the foot member 62 in the multi-joint module 100 are not limited by the first frame member cover unit 260 and the second frame member cover unit 270.

Further, a support 263 and 273 is formed on any one of the streamlined cover 262 and 272 and the plate shaped cover 264 and 274 of each of the first frame member cover unit 260 and the second frame member cover unit 270, thereby fixing the first frame member 230 or the second frame member 240 in the first frame member cover unit 260 or the second frame member cover unit 270, respectively.

In the present exemplary embodiment, as may be known from FIG. 13, the supports 263 and 273 are formed on the streamlined covers 262 and 272. Referring to FIG. 14, the supports 263 and 273 have one side ends coupled to inner side surfaces of the streamlined covers 262 and 272, and the other side ends coupled to one sides of the first and the second frame members 230 and 240, respectively, to support the first and the second frame members 230 and 240 inside the streamlined covers 262 and 272, respectively.

Meanwhile, in the present exemplary embodiment, when the second frame member 240 is maximally folded with respect to the first frame member 230, as may be known from FIG. 12, the first frame member cover unit 260 is matched with the second frame member cover unit 270 to form a single airfoil shape. Here, the first frame member cover unit 260 and the second frame member cover unit 270 may be disposed in a symmetric shape in a state of being matched with each other, but the present invention is not limited thereto.

As such, a cross section in a state in which the first and the second frame member cover units 260 and 270 are matched with each other is illustrated in FIG. 14.

According to the exemplary embodiment of the present invention, the underwater moving apparatus 10 swims in the water in a state in which the second frame member 240 is maximally folded with respect to the first frame member 230, and if the first frame member cover unit 260 and the second frame member cover unit 270 are formed to enclose the first frame member 230 and the second frame member 240 like the present exemplary embodiment, an outer circumferential surface of the leg unit 60 is formed in a streamlined shape, and as a result, resistance generated while the underwater moving apparatus swims in the water may be reduced.

In addition, when the leg unit 60 is formed in an airfoil shape by the first frame member cover unit 260 and the second frame member cover unit 270, balance of the underwater moving apparatus 10 may be maintained by moving the leg unit 60 of the underwater moving apparatus 10 as necessary.

For example, as illustrated in FIG. 15, when a front end portion of the leg unit 60 is rotated by an α angle about the first rotating axis A1 of the leg unit 60 in an upper direction with respect to a moving direction of the underwater moving apparatus 10, lift force and drag force are generated in accordance with a size of the angle.

According to the exemplary embodiment of the present invention, a posture and a position of the underwater moving apparatus 10 may be controlled by lift force and drag force which may be generated by rotating the leg unit having an outer surface of an airfoil shape.

Meanwhile, the aforementioned exemplary embodiment has illustrated that the first frame member cover unit 260 and the second frame member cover unit 270 have a type in which an inside thereof is vacant so that the first frame member 230 and the second frame member 240 may positioned therein, but the insides of the first frame member cover unit 260 and the second frame member cover unit 270 may be filled except for a space that is necessary to operate the first frame member 230 and the second frame member 240.

Further, the present exemplary embodiment has illustrated that the first frame member cover unit 260 and the second frame member cover unit 270 are separate configurations from the first frame member 230 and the second frame member 240, but the first frame member 230 and the second frame member 240 may be manufactured so that the first frame member 230 and the second frame member 240 are integrally formed with the first frame member cover unit 260 and the second frame member cover unit 270, or shapes of cross sections of the first frame member 230 and the second frame member 240 may be as streamlined shapes or airfoil shapes which are symmetric to each other.

As described above, the underwater moving apparatus according to the exemplary embodiment of the present invention has the body formed in a streamlined shape such that the underwater moving apparatus may easily move with less resistance of fluid when the underwater moving apparatus moves in the water.

Further, the underwater moving apparatus according to the exemplary embodiment of the present invention includes the plurality of leg units including the multi-joint member, and moves by walking on the floor surface using the leg units, thereby facilitating the movement on the floor surface. Further, the underwater moving apparatus according to the exemplary embodiment of the present invention moves by walking on the floor surface, thereby preventing sand, soil, or the like on the floor surface from being scattered while moving on the floor surface.

Further, the underwater moving apparatus according to the exemplary embodiment of the present invention has the leg unit which may be folded when the underwater moving apparatus swims in the water, and therefore the leg unit is configured to receive less resistance of fluid when the underwater moving apparatus moves in the water.

Further, in a case in which as another example of the underwater moving apparatus of the present invention, the leg unit is configured to include a cover unit which may be formed in a streamlined shape, the leg unit of the underwater moving apparatus may be used as a fin to control a posture and a position of the underwater moving apparatus.

Hereinafter, a moving method of the underwater moving apparatus according to the exemplary embodiment of the present invention will be described with reference to the drawings.

Figure 16:
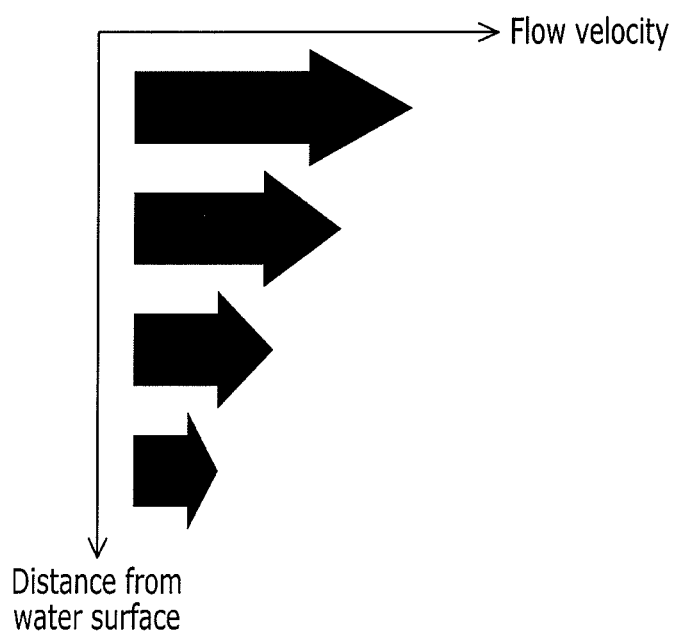
FIG. 16 is a graph illustrating a general variation in flow velocity in accordance with a water depth.
Figure 17:
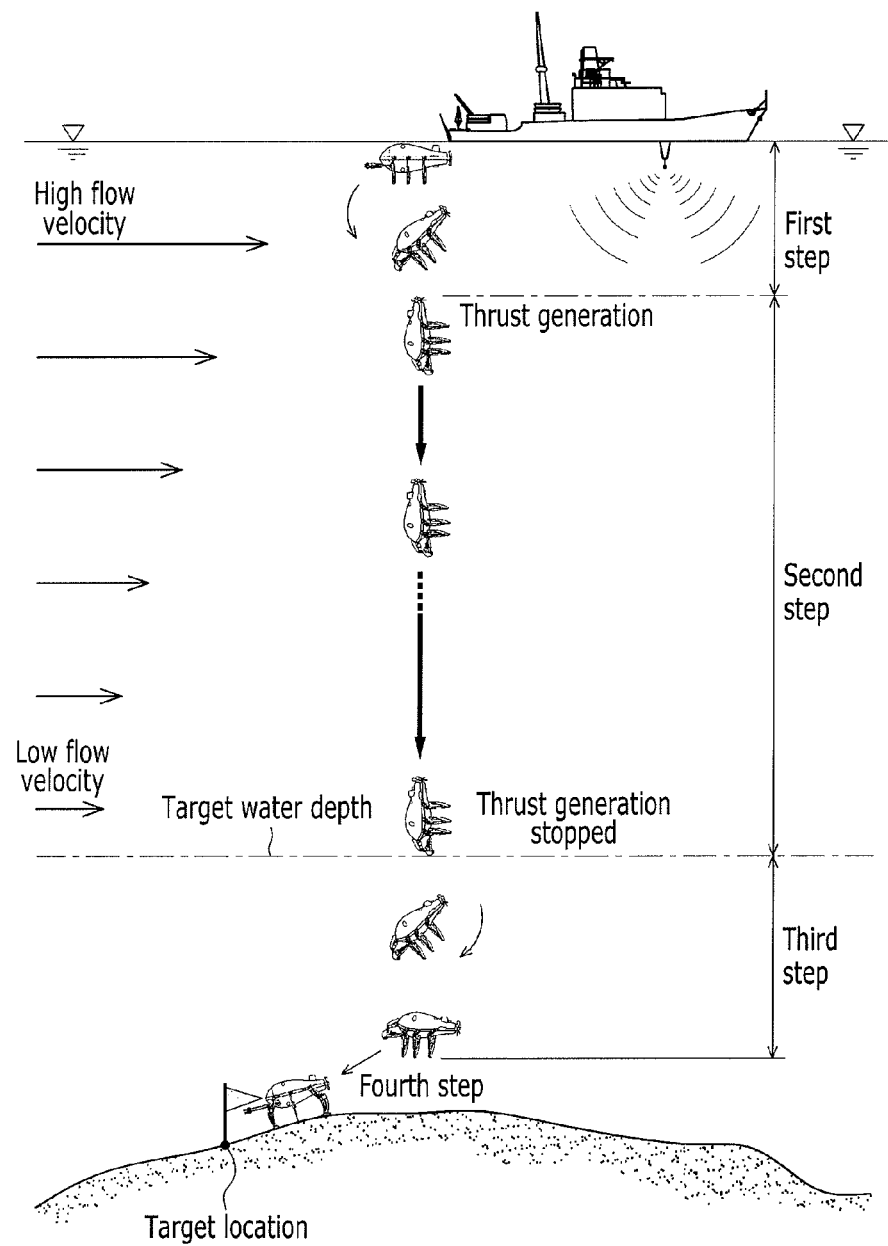
FIG. 17 is a conceptual view illustrating a moving step to overcome the tide according to the exemplary embodiment of the present invention.
Figure 18:
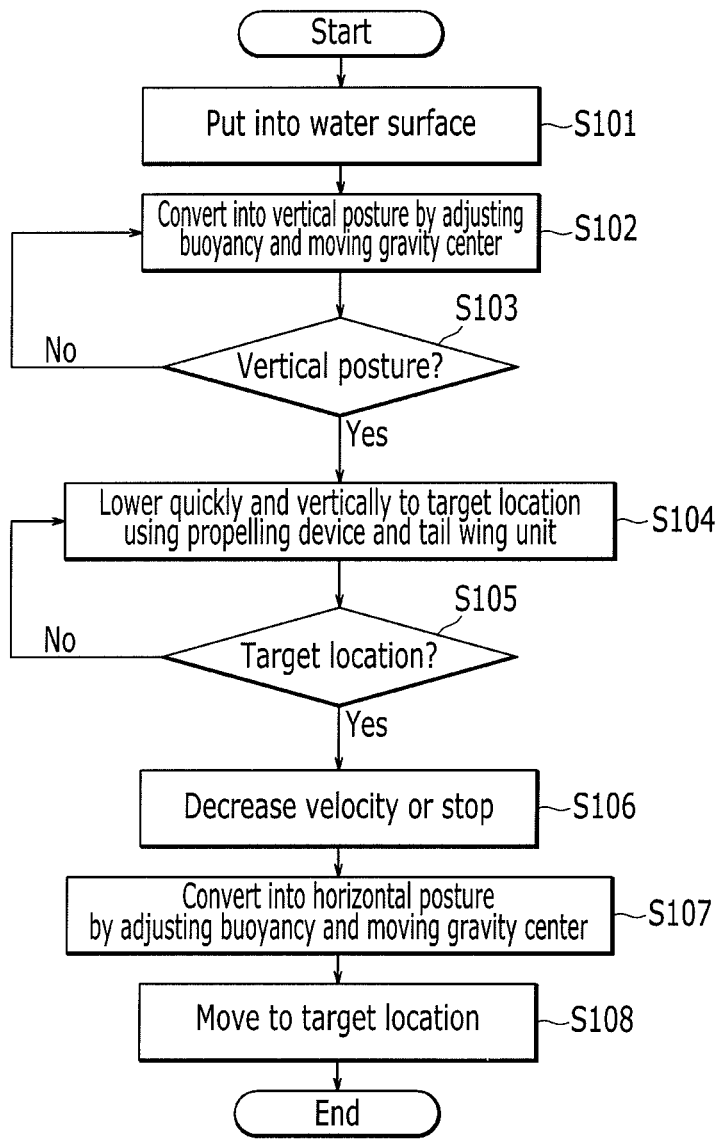
FIG. 18 is a flowchart illustrating a moving method to overcome the tide according to the exemplary embodiment of the present invention.

FIG. 16 is a graph illustrating a general variation in flow velocity in accordance with a water depth. FIG. 17 is a conceptual view illustrating a moving step to overcome the tide according to the exemplary embodiment of the present invention. FIG. 18 is a flowchart illustrating a moving method to overcome the tide according to the exemplary embodiment of the present invention.

Referring to appended FIG. 16, generally, distribution of flow velocity is varied in accordance with a water depth, a flow velocity at the water surface is the highest, and the flow velocity becomes low as a distance from the water surface is increased. Therefore, the underwater moving apparatus 10 according to the exemplary embodiment of the present invention is operated to be quickly moved away from a location where the flow velocity is high because of the tide and the ocean current, and to be moved to the target location.

Referring to FIGS. 17 and 18, the underwater moving apparatus 10 according to the exemplary embodiment of the present invention is put from the mother ship into the water surface at a position in consideration of the target location on the sea floor (S101). Because the underwater moving apparatus 10, which is put into the water surface, needs to swim to the target location, the leg units 60 are folded in order to minimize resistance of fluid.

The posture of the underwater moving apparatus 10 is converted into a vertical posture in which a bowDeletedTextsis oriented toward the target location (sea floor direction) by adjusting buoyancy and moving a center of gravity (S102).

The buoyancy generating unit 80 of the underwater moving apparatus 10 adjusts buoyancy so that the negative buoyancy is generated on the front portion, and the positive buoyancy is generated on the rear portion, and the underwater moving apparatus makes a roly poly posture so as to vertically and quickly swim in a lower direction toward the target location on the sea floor.

In addition, the gravity center moving unit 160 moves a gravity center to the front portion by corresponding to an operation according to an adjustment of the buoyancy, and generates moment for changing and maintaining the vertical posture [first step].

When the underwater moving apparatus 10 determines that a slope of the body is vertical within an allowable range (S103; Yes), the underwater moving apparatus 10 moves down quickly and vertically to the target location by using the propelling device 30 and the tail wing unit 40 (S104). The target location is a position inputted from the mother ship, and may be recognized through a position tracking device using an ultrasonic wave.

Because moment, which always maintain the vertical posture by a roly poly principle, is applied to the underwater moving apparatus 10, energy consumption for controlling the posture is low, and because the underwater moving apparatus 10 has a linear shape of which resistance of fluid is low, the underwater moving apparatus 10 may move down to a desired water depth with minimum energy.

When the underwater moving apparatus 10 determines that the underwater moving apparatus 10 reaches a predetermined target water depth and the target distance from the sea floor (S105; Yes), the underwater moving apparatus 10 decreases a lowering velocity or stops by stopping an operation of the propelling device 30 or generating reverse thrust (S106).

Here, the target water depth is set information considering a water depth of the target location to decrease or stop a velocity of the underwater moving apparatus 10 in order to convert a posture of the underwater moving apparatus 10 into a horizontal posture before the underwater moving apparatus 10 reaches a water depth of the target location. However, because a height of the sea floor may be uneven in accordance with topography, the target distance is further set to prevent the underwater moving apparatus 10 from colliding with the protruding sea floor [second step].

The posture of the underwater moving apparatus 10 is converted into a horizontal posture in a state of a low velocity or in a stopped state by adjusting buoyancy and moving a center of gravity (S107). That is, by an operation opposite to the operation in Step S102, when the buoyancy generating unit 80 of the underwater moving apparatus 10 adjusts buoyancy so that the positive buoyancy is generated on the front portion, and negative buoyancy is generated on the rear portion, and then when the body is horizontal, the buoyancy generating unit 80 generates the neutral buoyancy to make the horizontal posture of the buoyancy generating unit 80.

In addition, the gravity center moving unit 160 moves a gravity center to a central portion by corresponding to an operation according to an adjustment of the buoyancy, and generates moment for changing and maintaining the horizontal posture [third step].

After making the horizontal posture, the underwater moving apparatus 10 moves to the target location by using at least any one of the propelling device 30, the tail wing unit 40, the thruster unit 50, and the leg unit 60 (S104). After the underwater moving apparatus 10 moves to the target location, the underwater moving apparatus 10 may be seated on the sea floor by spreading the leg units 60 that have been folded [fourth step].

As such, the underwater moving apparatus 10 according to the exemplary embodiment of the present invention converts a posture into a vertical posture using the buoyancy generating unit 80 and the gravity center moving unit 160, and moves down quickly to a desired water depth by generating thrust, and therefore there is an effect in that the underwater moving apparatus 10 may overcome the tide and may move to the target water depth.

Further, the underwater moving apparatus stops at a predetermined water depth or a predetermined distance from the sea floor, converts a posture into a horizontal posture, and then moves to the target location, therefore there is an effect that the underwater moving apparatus may be safely operated.

In addition, the underwater moving apparatus has a streamlined shape body and multi-joint legs, which are folded when the underwater moving apparatus swims, and therefore there is an effect in that resistance of fluid may be reduced, and the underwater moving apparatus may adapt to a high flow velocity, which is generated due to influence by the tide and the ocean current.

While the exemplary embodiments of the present invention have been described, the present invention is not limited to only the aforementioned exemplary embodiments, and various alterations may be possible.

For example, in the exemplary embodiment of the present invention, which is illustrated in FIGS. 17 and 18, a moving method of the underwater moving apparatus 10 to the target location in the water by overcoming the tide is mainly described, but the present invention is not limited thereto, and may be applied when the underwater moving apparatus is floated to the water surface.

That is, in a case in which the underwater moving apparatus 10 moves up after completing work, oppositely to the aforementioned exemplary embodiment, a posture is converted into the vertical posture in which the front portion is oriented toward the water surface by adjusting buoyancy so that the positive buoyancy is generated on the front portion, and the negative buoyancy is generated on the rear portion.

Further, moment for changing and maintaining the vertical posture toward the water surface is generated by moving a center of gravity to the rear portion side. Next, the underwater moving apparatus generates thrust to vertically move up to the water surface. The underwater moving apparatus 10 floated on the water surface transmits position information (for example, GPS) to the mother ship, and then may be recovered.

Accordingly, the underwater moving apparatus 10 according to the exemplary embodiment of the present invention is quickly floated by overcoming the tide after completing work, and therefore there is an effect in that the underwater moving apparatus may be safely recovered.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The underwater moving apparatus according to the exemplary embodiment of the present invention converts a posture into a vertical posture by adjusting buoyancy and moving a center of gravity, and moves down quickly to a desired water depth by generating thrust so as to easily move to the target water depth. Further, the underwater moving apparatus stops at a predetermined water depth or a predetermined distance from the sea floor, converts a posture into a horizontal posture, and then moves to the target location, and therefore the underwater moving apparatus may be safely operated.

What is claimed is:

1. An underwater moving apparatus, comprising:
   a body;
   a propelling device installed on a rear side of the body;
   a thruster unit including an up and down directional thruster and a left and right directional thruster installed at the body; and
   a plurality of leg units positioned at both side portions of the body and including a multi joint module,
   wherein the multi joint module includes a first frame member coupled to one side of the body to be rotatable and a second frame member coupled to one end portion of the first frame member to be rotatable,
   wherein the second frame member is arranged in a state of being folded with respect to the first frame member by being rotated.

2. The underwater moving apparatus of claim 1, wherein: the body has a cross section in a forward and rearward direction having a circular or elliptical shape, and the body has a streamlined shape from a front end portion to a rear end portion.

3. The underwater moving apparatus of claim 1, further comprising:
   at least one arm unit positioned at a front side of the body and including the multi joint module.

4. The underwater moving apparatus of claim 1, further comprising:
   a tail wing unit positioned at a front side of the propelling device.

5. The underwater moving apparatus of claim 1, further comprising:
   a buoyancy generating unit positioned in the body,
   wherein the buoyancy generating unit includes:
   a fluid storage tank;
   an extendable pocket member connected to the fluid storage tank; and
   a pump installed between the fluid storage tank and the pocket member to transfer a fluid stored in the fluid storage tank to the pocket member.

6. The underwater moving apparatus of claim 5, wherein:
   a pair of buoyancy generating units is formed at a front portion and a rear portion of the body.

7. The underwater moving apparatus of claim 1, further comprising:
   a gravity center moving unit installed in the body,
   wherein the gravity center moving unit includes:
   a weight body formed to be movable in the body;
   a ball screw coupled to the weight body in order to move the weight body;
   a driving motor configured to rotate the ball screw; and
   a pair of LM guides arranged in parallel with the ball screw so as to guide a movement of the weight body.

8. The underwater moving apparatus of claim 1, wherein:
   the multi-joint module further includes:
   a rotating shaft member coupled to the body to be rotatable about a first rotating axis extended in an outward direction of the body; and
   a joint member coupled to one end portion of the rotating shaft member to be rotatable about a second rotating axis which is vertical to the first rotating axis,
   wherein the first frame member coupled to one end portion of the joint member to be rotatable about a third rotating axis which is vertical to the first rotating axis and the second rotating axis,
   wherein the second frame member coupled to one end portion of the first frame member to be rotatable about a fourth rotating axis which is in parallel to the third rotating axis.

9. The underwater moving apparatus of claim 8, wherein:
   the leg unit further includes a foot member rotatably installed on an end portion of the second frame member.

10. The underwater moving apparatus of claim 8, wherein:
    the second frame member is arranged in a state of being folded with respect to the first frame member by being rotated about the fourth rotating axis.

11. The underwater moving apparatus of claim 8, further comprising:
    a first frame member cover unit configured to enclose the first frame member; and
    a second frame member cover unit configured to enclose the second frame member.

12. The underwater moving apparatus of claim 11, wherein:
    each of the first frame member cover unit and the second frame member cover unit includes:
    a streamlined cover having an airfoil shaped cross section;

a plate shaped cover coupled to a concave surface of the streamlined cover and having a fourth rotating axis hole through which the fourth rotating axis penetrates; and a support formed on any one of the streamlined cover and the plate shaped cover to fix the first frame member or the second frame member to inner sides of the streamlined cover and the plate shaped cover.

13. The underwater moving apparatus of claim 12, wherein:

a third rotating axis hole where the first frame member is coupled to a joint member and through which the third rotating axis penetrates, and a cylinder guide hole formed so as not to hinder a movement of an end portion of a piston of a hydraulic cylinder of the first frame member, are formed in the plate shaped cover of the first frame member cover unit, and holes corresponding to the fourth rotating axis hole and cylinder guide hole of the plate shaped cover of the first frame member cover unit are formed in the plate shaped cover of the second frame member cover unit.

14. The underwater moving apparatus of claim 12, wherein:

the streamlined cover of the first frame member cover unit and the streamlined cover of the second frame member cover unit are formed to form an airfoil shape in a state in which the second frame member is rotated about the fourth rotating axis to be in parallel to the first frame member, and the plate shaped cover of the first frame member cover unit and the plate shaped cover of the second frame member cover unit are formed to be overlapped with each other in a state in which the second frame member is rotated about the fourth rotating axis to be parallel to the first frame member.

15. A moving method of the underwater moving apparatus disclosed in claim 1 to a target location on a sea floor while overcoming the tide, the method comprising:

a) converting a posture of the body into a vertical posture oriented toward the target location when the underwater moving apparatus is put into a water surface;

b) decreasing a velocity or stopping when the underwater moving apparatus moves down vertically to the target location and reaches a predetermined water depth;

c) converting a posture of the body into a horizontal posture; and d) moving the underwater moving apparatus to the target location by using at least one of the propelling device, the thruster unit, and the leg unit.

16. The moving method of claim 15, wherein:

step a) includes converting a posture into the vertical posture in which the front portion is oriented toward the target location by adjusting buoyancy so that negative buoyancy is generated on the front portion of the body, and positive buoyancy is generated on the rear portion; and generating moment for changing and maintaining the vertical posture by moving a center of gravity to the front portion side.

17. The moving method of claim 15, further comprising:

between step a) and step b), driving the propelling device when it is determined that a slope of the body is vertical within an allowable range.

18. The moving method of claim 15, wherein:

step b) includes determining whether the underwater moving apparatus reaches any one of a predetermined target water depth and the target distance from the sea floor; and stopping the underwater moving apparatus by stopping an operation of the propelling device or generating reverse thrust.

19. The moving method of claim 18, wherein:

step c) includes generating neutral buoyancy when the horizontal posture is made by adjusting buoyancy so that negative buoyancy is generated on the rear portion of the body, and positive buoyancy is generated on the front portion; and generating moment for changing and maintaining the horizontal posture by moving a center of gravity of the front portion side to a central portion.

20. The moving method of claim 15, further comprising:

before step a), folding the plurality of leg units.

21. The moving method of claim 15, further comprising:

after step d), converting a posture into the vertical posture in which the front portion is oriented toward the water surface by adjusting buoyancy so that the positive buoyancy is generated on the front portion, and the negative buoyancy is generated on the rear portion, in a case in which the underwater moving apparatus moves up after completing work; and generating moment for changing and maintaining the vertical posture oriented toward the water surface by moving a center of gravity to the rear portion side; and raising the underwater moving apparatus vertically to the water surface by generating thrust of the propelling device.

22. The underwater moving apparatus of claim 1, wherein:

in the state of being folded, the leg unit has an airfoil shaped cross-section.

* * * * *